SIGNAL CONVERTER FOR CONVERTING A BINARY SIGNAL TO A RECIPROCAL ANALOG SIGNAL

Filed Oct. 5, 1964

John S. Smith
INVENTOR.

BY Richard E. Bee

ATTORNEY 3,400,390

SIGNAL CONVERTER FOR CONVERTING A BINARY SIGNAL TO A RECIPROCAL ANALOG SIGNAL

John S. Smith, Ridgefield, Conn., assignor to Schlumberger Technology Corporation, Houston, Tex., a corporation of Texas Filed Oct. 5, 1964, Ser. No. 401,598
5 Claims. (Cl. 340—347)

ABSTRACT OF THE DISCLOSURE

An illustrative embodiment of the invention converts a binary signal to an analog output that is inversely proportional to the numerical value of the input. Each binary signal bit enables or disables an associated transistor switch to connect or disconnect an individual resistance in parallel with a constant current source. The admittance of each resistance is directly proportional to the numerical weight accorded to the respective bit. The voltage thereby established across the entire array of connected parallel resistances is proportional to the reciprocal of the numerical value of the binary input signal.

This invention relates to electrical signal converters and, particularly, to signal converters of the binary-to-analog type.

With the increasing use of digital computers and digital data processing machines, more and more data signals and measurement signals are being recorded and stored in digital form. It is sometimes desired to convert such recorded signals into analog signals for purposes of producing a visible indication or record of the signal values. It is, at times, also desirable to produce an analog indication of the mathematical reciprocal of the recorded signal values. Using known techniques, the reciprocal computation and the binary-to-analog conversion would be performed by two different sets of circuits, with the reciprocal computation being performed either before or after the binary-to-analog conversion. This, however, requires a relatively large number of circuits. Also, known types of reciprocal computer circuits are either rather complex in nature or else have rather limited operating ranges.

It is an object of the invention, therefore, to provide a new and improved computer circuit for computing the reciprocal of a data signal value.

It is another object of the invention to provide a new and improved signal converter for converting a binary signal to an analog signal which, at the same time, causes the analog signal to represent the reciprocal of the binary signal value.

In accordance with the invention, a signal converter for converting a binary signal to a reciprocal analog signal comprises circuit means for supplying binary signals for the individual bits of a plural-bit binary-coded signal. The signal converter also includes a parallel circuit having a plurality of branches connected in parallel with one another, one branch being provided for each bit in the binary-coded signal and each branch comprising an impedance element connected in series with a switching device. Each of the switching devices is responsive to a different one of the binary bit signals for activating its branch for one binary value and for disabling its branch for the other binary value of such bit signal. Each of the impedance elements has an admittance value which provides for its branch an admittance proportional to the bit weight of the binary bit signal to which its switching device is responsive. The signal converter further includes circuit means for supplying a constant current to the parallel circuit to develop thereacross a voltage drop which constitutes an analog signal proportional to the reciprocal of the numerical value represented by the binary-coded signal.

For a better understanding of the present invention together with other and further objects thereof, reference is had to the following description taken in connection with the accompanying drawing, the scope of the invention being pointed out in the appended claims.

Referring to the drawing.

Figure 1:
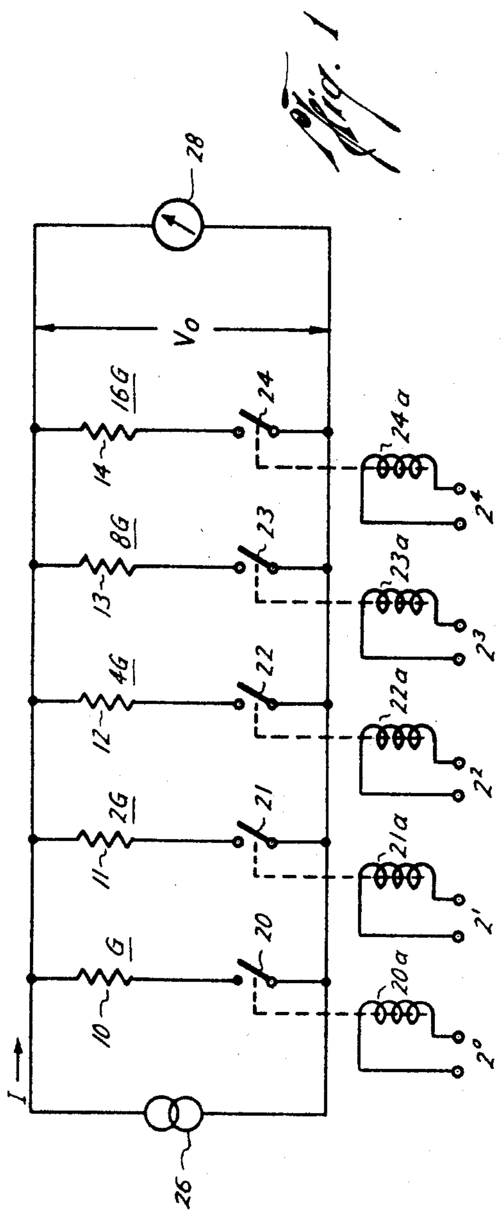
FIG. 1 is a circuit diagram of one form of the present invention.

Referring to FIGURE 1 of the drawing, there is shown a representative embodiment of a signal converter for converting a binary code signal to a reciprocal analog signal. The signal converter includes a parallel circuit having a plurality of branches connected in parallel with one another, one branch being provided for each bit in the binary-coded signal. Each branch comprises an impedance element connected in series with a switching device. In FIG. 1, the first branch of the parallel circuit is formed by a resistor 10 in series with a switch 20, the second branch is formed by a resistor 11 in series with a switch 21, the third branch is formed by a resistor 12 in series with a switch 22, the fourth branch is formed by a resistor 13 in series with a switch 23 and the fifth branch is formed by a resistor 14 in series with a switch 24. The use of five branches is intended as an example only. A greater or lesser number of branches may be used, depending upon the number of bits in the binary signal being converted.

Switches 20–24 are of the relay type and, as such, are controlled by individual relay coils 20*a*–24*a*, respectively. In the present embodiment, a switch is closed whenever its relay coil is energized. These relay coils 20*a*–24*a* are connected to the circuits which supply the binary signals for the individual bits of the binary-coded signal. The coil 20*a* for the switch 20 is connected to the circuit which supplies the signal for the least-significant bit, while the coils 21*a*–24*a* for the remainder of the switches 21–24 are connected to circuits for bits of increasing significance, the coil 24*a* being connected to the circuit for the most-significant bit. By "least-significant" bit is meant the bit having the smallest numerical weight or numerical value. Similarly, the "most-significant" bit is the one having the greatest numerical weight.

The signal converter also includes circuit means for supplying a constant current to the parallel circuit formed by the various resistor-switch branches. This circuit means is represented by a constant current source 26 which supplies a current of magnitude I to the parallel circuit. The current source 26 should have a relatively high impedance compared to the impedance or resistance of the largest resistor in any of the parallel branches. In this embodiment, the source impedance should be large compared to the resistance value of resistor 10 in the first branch.

In order to provide the reciprocal conversion action, the admittance values or conductance values of resistors 10–14 are proportioned in accordance with the numerical weights of the binary bit signals which control the switches in their respective branches. Thus, for binary weights of 1, 2, 4, 8 and 16, the resistor 10 in the first branch is provided with a conductance value of G, the resistor 11 is provided with a conductance value of 2G, the resistor 12 is provided with a conductance value of 4G, the resistor 13 is provided with a conductance value of 8G and the resistor 14 in the fifth branch is provided with a conductance value of 16G.

As will be seen, the resulting voltage drop $V_0$ across the parallel circuit constitutes an analog signal having a magnitude which is proportional to the reciprocal of the numerical value represented by the binary coding of the binary signal. In the present embodiment, this analog signal $V_0$ is shown as being supplied to a high impedance voltmeter 28. Other forms of output utilization devices and circuits will, however, frequently be used. In many cases, for example, the output analog signal $V_0$ will be supplied to the recording element of a graphic or strip-chart recorder. In any case, the output utilization device should present a relatively high impedance to the parallel circuit. In particular, the impedance of the output device should be many times greater than the impedance or resistance value of the largest resistor in any of the parallel branches. In the present embodiment, this impedance should be many times greater than the resistance value of resistor 10 in the first branch.

Considering the operation of the FIG. 1 signal converter, the individual binary signals representing the different bits of a plural-bit binary coded signal are supplied to individual ones of the relay coils **20*a*–24*a*. Any binary bit signal having a binary "one" value is effective to energize its relay coil which, in turn, closes the switch in one of the branches of the parallel circuit. The relay coil for any bit signal having a binary "zero" value remains unenergized and, as a consequence, its switch remains open. Current flow from the source 26 through the parallel circuit branches whose switches are closed produces a resulting voltage drop $V_0$ across the parallel circuit. This voltage drop $V_0$ has a magnitude which is proportional to the reciprocal of the numerical value represented by the binary coding of the five binary bit signals which are, at that moment, being supplied to the five relay coils 20*a*–24*a*. This voltage drop is read by the voltmeter 28**.

The reason the output voltage $V_0$ is proportional to the reciprocal of the numerical value represented by the binary input can be seen by considering the mathematical expression for a plural-bit binary number. This mathematical expression for the case of a binary 1, 2, 4, 8, etc., code is:

$$N=B_0 2^0+B_1 2^1+B_2 2^2+B_3 2^3+ \dots \quad (1)$$

where N is the numerical value of the binary number, where each term on the right hand of the side of the equation represents one of the binary bits, the factors $2^0$, $2^1$, $2^2$, etc., represent the numerical weights for the corresponding bits and the factors $B_0$, $B_1$, $B_2$, $B_3$, etc., are coefficients which may assume a value of either zero or one. In the present embodiment, a "zero" value for the B coefficients is represented by the case where the corresponding switch in the parallel circuit is open, while a "one" value represents the case where the switch is closed. The output voltage $V_0$ read by the voltmeter 28 is:

$$V_o=\frac{I}{G_t} \quad (2)$$

where I is the current from source 26 and $G_t$ is the total conductance for the parallel circuit. Since conductances in parallel are additive and since the conductance values in the different branches of the parallel circuit are proportioned in accordance with the binary bit weights, the total conductance is:

$$G_t=B_0 2^0 G+B_1 2^1 G+B_2 2^2 G+B_3 2^3 G+ \dots \quad (3)$$

where the B coefficients are "zero" if the switches are open and are "one" if the switches are closed. Comparing Equation 3 with Equation 1, it is seen that:

$$G_t=GN \quad (4)$$

where G is the conductance in the branch for the least-significant bit and N is the numerical value represented by the plural-bit binary signal. Substituting Equation 4 into Equation 2 gives:

$$V_o=\frac{I}{GN} \quad (5)$$

Equation 5 shows that the output voltage $V_0$ is proportional to the reciprocal of the binary number N. The I and G factors are constant.

Figure 2:
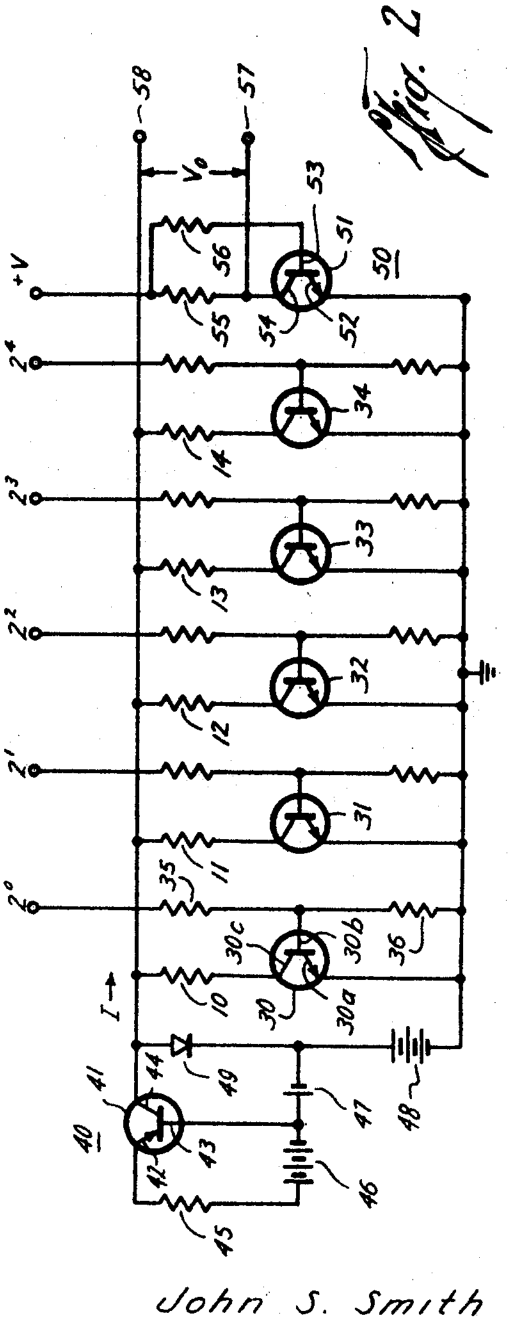
FIG. 2 is a circuit diagram of another embodiment of the present invention.

Referring now to FIGURE 2 of the drawing, there is shown a modified embodiment of the present invention. The FIG. 2 circuit is similar to that of FIG. 1 except that, among other things, the relay-controlled switches 20–24 of FIG. 1 have been replaced by transistor switches 30–34 in FIG. 2. The resistors 10–14 in FIG. 2 have the same conductance values as in FIG. 1, namely, G, 2G, 4G, 8G and 16G, respectively. Considering in detail the first branch of the parallel circuit in FIG. 2, the transistor switch 30 in this branch is an ordinary n-p-n type transistor having an emitter electrode **30*a*, a base electrode 30*b* and a collector electrode 30*c*. The first branch of the parallel circuit is formed by the resistor 10 in series with the collector-to-emitter portion of the transistor 30, the emitter electrode 30*a* being connected to the lower end of this first branch. The least-significant binary bit signal (weight of 2°) is supplied to the base electrode 30*b* of transistor 30 by way of resistors 35 and 36. A binary "one" value for this bit signal renders the transistor 30 conductive, while a binary "zero" value renders the transistor 30 nonconductive. Thus, the transistor 30 behaves in the same manner as the switch 20 of FIG. 1. Resistors 35 and 36 are proportioned so that for the particular voltage value being used to represent a binary "one" level, the transistor 30** will be operated in a saturated condition when it is conductive. This causes the collector-to-emitter voltage drop to be relatively small and not dependent upon the magnitude of the collector-to-emitter current flow.

The remainder of the transistor switching devices 31–34 in the four remaining parallel branches are constructed and operated in a similar fashion.

In FIG. 2, the constant current source is in the form of a common-base type of transistor circuit 40. Circuit 40 includes a p-n-p type transistor 41 having an emitter electrode 42, a base electrode 43 and a collector electrode 44. A resistor 45 and battery 46 are connected between the emitter 42 and the base 43. Batteries 47 and 48 are connected in series between the base 43 and the collector 44 by way of the parallel circuit branches formed by resistors 10–14 and transistor 30–34. A diode 49 is connected between the collector electrode 44 and the junction between batteries 47 and 48 to limit the voltage across the parallel circuit for the case where all of the transistors 30–34 are nonconductive. Circuit constants for the circuit 40 are proportioned so that transistor 41 is operated in a non-saturated condition.

In FIG. 2, the output circuit means for the signal converter includes a transistor circuit 50 which compensates for the small voltage drops occurring across the switching transistors 30–34. Circuit 50 includes a transistor 51 having an emitter electrode 52, a base electrode 53 and a collector electrode 54. Transistor 51 is of the same type as the switching transistors 30–34. Collector electrode 54 is connected by way of a resistor 55 to a positive potential source +V, while emitter electrode 52 is connected to chassis ground the same as are the emitters of the switching transistors 30–34. The base 53 of transistor 51 is connected to the voltage source +V by way of a resistor 56. The circuit constants are proportioned so that transistor 51 is always conductive and is operated in a saturated condition. The analog output voltage $V_0$ for the converter of FIG. 2 is taken between a pair of output terminals 57 and 58, where the lower terminal 57 is connected to the collector electrode of transistor 51 and the upper output terminal 58 is connected to the upper side of the parallel circuit branches. Circuit 50 is operated so that the collector-to-emitter voltage drop across transistor 51 is substantially the same as the collector-to-emitter voltage drop across any of the switching transistors 30–34. Because the lower output terminal 57 is connected to the collector 54, the collector-to-emitter voltage drop across transistor 51 effectively offsets the collector-to-emitter voltage drop across the switching transistors 30–34, hence eliminating this small voltage drop from the final output signal $V_0$.

Another manner of constructing the circuit of FIG. 2 which would eliminate the need for the transistor circuit 50 would be to include the conductive-state collector-to-emitter resistance of each of the switching transistors as part of the resistance constituting the desired total resistance value for its branch. In such case, however, care would need be taken that the transistor resistances do not change with age or temperature. For this reason, the first mode of operation is preferred.

Considering now the operation of the FIG. 2 embodiment, the current supply circuit 40 supplies a constant D.C. current I to the parallel circuit formed by resistors 10–14 and transistors 30–34. The binary signals for the individual binary bits are supplied to the base electrodes of the various transistors 30–34 to render conductive those transistors for which the bit value is a binary "one." The resulting voltage drop across the parallel circuit is monitored by the output circuit 50 to provide across the output terminals 57 and 58 an analog output voltage $V_0$ which is proportional to the reciprocal of the numerical value represented by the binary coding of the bit signals.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A signal converter for converting a binary signal to a reciprocal analog signal comprising: circuit means for supplying binary signals for the individual bits of a plural-bit binary-coded signal; a parallel circuit having a plurality of branches connected in parallel with one another, one branch being provided for each bit in the binary-coded signal; at least one impedance element in each of said parallel circuit branches, said impedance being inversely proportional to the weight of the associated individual bit; a plurality of switching devices each coupled in series with a respective one of said impedance elements, each of said switching devices being responsive to a different one of said binary bit signals for activating its respective branch for one binary value and for disabling its branch for the other binary value to which said switching device is responsive and circuit means for supplying a constant current to the parallel circuit to develop there across a voltage drop which constitutes an analog signal proportional to the reciprocal of the numerical value represented by the binary-coded signal.

2. A signal converter for converting a binary signal to a reciprocal analog signal comprising: circuit means for supplying binary signals for the individual bits of a plural-bit binary-coded signal; a parallel circuit having a plurality of branches connected in parallel with one another, one branch being provided for each bit in the binary-coded signal; a plurality of resistors, at least one of each of said resistors connected in a respective one of said parallel branches, said resistors being inversely proportional in resistance to the weight of the associated bit; a plurality of switching devices, each of said switching devices being responsive to a different one of the binary bit signals for activating its branch for one binary value and for disabling its branch for the other binary value of such bit signal; and circuit means for supplying a constant current to the parallel circuit to develop thereacross a voltage drop which constitutes an analog signal proportional to the reciprocal of the numerical value represented by the binary-coded signal.

3. A signal converter for converting a binary signal to a reciprocal analog signal comprising: circuit means for supplying binary signals for the individual bits of a plural-bit binary-coded signal; a parallel circuit having a plurality of branches connected in parallel with one another, one branch being provided for each bit in the binary-coded signal; a resistor connected in each of said branches, said resistors being inversely proportional to the weight of the respective associated individual bits; a plurality of switching devices, each of said switching devices being responsive to a different one of the binary bit signals for activating a respective one of said branches for one binary value and for disabling its branch for the other binary value of such bit signal; and circuit means for supplying a constant current to the parallel circuit to develop thereacross a voltage drop which constitutes an analog signal proportional to the reciprocal of the numerical value represented by the binary-coded signal.

4. A signal converter for converting a binary signal to a reciprocal analog signal comprising: circuit means for supplying binary signals for the individual bits of a plural-bit binary-coded signal; a parallel circuit having a plurality of branches connected in parallel with one another, one branch being provided for each bit in the binary-coded signal; a plurality of impedance elements each individual to a respective one of said parallel circuit branches, said impedance elements being inversely proportional to the weight of the respective associated individual bits; a plurality of switching devices, each of said switching devices being responsive to a different one of the binary bit signals for activating said parallel circuit branch associated therewith for one binary value and for disabling said branch for the other binary value of the bit signal; circuit means for supplying a constant current to the parallel circuit; and circuit means responsive to the voltage drop across the parallel circuit for providing an analog signal proportional to the reciprocal of the numerical value represented by the binary-coded signal.

5. A signal converter for converting a binary signal to a reciprocal analog signal comprising: circuit means for supplying at least four binary signals, the first having a numerical weight of $2^0$, the second having a numerical weight of $2^1$, the third having a numerical weight of $2^2$ and the fourth having a numerical weight of $2^3$; a parallel circuit having at least four branches connecting in parallel with one another, each branch comprising a resistor connected in series with a switching device, the resistor in the first branch having a conductance value of G, the resistor in the second branch having a conductance value of 2G, the resistor in the third branch having a conductance value of 4G, and the resistor in the fourth branch having a conductance value of 8G, the switching device in the first branch being responsive to the first binary signal for opening and closing the first branch in accordance with the binary value thereof, the switching device in the second branch being responsive to the second binary signal for opening and closing the second branch in accordance with the binary value thereof, the switching device in the third branch being responsive to the third binary signal for opening and closing the third branch in accordance with the binary value thereof, and the switching device in the fourth branch being responsive to the fourth binary signal for opening and closing the fourth branch in accordance with the binary value thereof; and circuit means for supplying a constant current to the parallel circuit to develop thereacross a voltage drop which constitutes an analog signal proportional to the reciprocal of the numerical value represented by the binary coding of the four binary signals.

References Cited

UNITED STATES PATENTS

| | | | |
|---|---|---|---|
| 2,738,504 | 3/56 | Gray | 340—347 |
| 2,943,237 | 6/60 | Bell | 340—347 |
| 2,954,551 | 9/60 | Doucette et al. | 340—347 |
| 3,019,426 | 1/62 | Gilbert | 340—347 |
| 3,030,619 | 4/62 | Ostrov et al. | 340—347 |
| 3,155,963 | 11/64 | Boensel | 340—347 |
| 3,160,874 | 12/64 | Hamori | 340—347 |
| 3,241,133 | 3/66 | Herzl | 340—347 |
| 3,247,397 | 4/66 | Kopek et al. | 340—347 |

MAYNARD R. WILBUR, *Primary Examiner.*

W. J. KOPACZ, *Assistant Examiner.*